US012535883B2

(12) United States Patent
Wawrzinek et al.

(10) Patent No.: US 12,535,883 B2
(45) Date of Patent: Jan. 27, 2026

(54) EYE TRACKER WITH HARDWARE FILTERING AND SOFTWARE SORTING (71) Applicant: Alcon Inc., Fribourg (CH)

(72) Inventors: Thomas Johannes Wawrzinek, Berlin (DE); Tobias Jura Rapoport, Berlin (DE)

(73) Assignee: ALCON INC., Fribourg (CH)

( * ) Notice: Subject to any disclaimer, the term of this patent is extended or adjusted under 35 U.S.C. 154(b) by 320 days.

(21) Appl. No.: 18/326,548

(22) Filed: May 31, 2023

(65) Prior Publication Data

US 2023/0393656 A1 Dec. 7, 2023

Related U.S. Application Data (60) Provisional application No. 63/365,721, filed on Jun. 2, 2022.

(51) Int. Cl.
G06F 3/01 (2006.01)
G02B 27/00 (2006.01)
G06V 10/20 (2022.01)
G06V 40/18 (2022.01)

(52) U.S. Cl.
CPC ......... G06F 3/013 (2013.01); G02B 27/0093 (2013.01); G06V 10/255 (2022.01); G06V 40/197 (2022.01)

(58) Field of Classification Search
None
See application file for complete search history.

(56) References Cited

U.S. PATENT DOCUMENTS

| 10,064,552 | B1 | 9/2018 | Vaziri |
| 12,322,123 | B2* | 6/2025 | Grancharov ............. G06T 7/33 |
| 2004/0005083 | A1 | 1/2004 | Fujimura et al. |
| 2010/0106143 | A1 | 4/2010 | Riedel et al. |
| 2011/0158558 | A1* | 6/2011 | Zhao ................... G06F 16/5854 382/305 |
| 2012/0212598 | A1* | 8/2012 | Mowrey ................ A61B 3/158 348/78 |
| 2013/0211387 | A1 | 8/2013 | Riedel |
| 2021/0011551 | A1 | 1/2021 | Andersson |
| 2021/0169320 | A1 | 6/2021 | Tripathi et al. |

FOREIGN PATENT DOCUMENTS

| JP | 2022029777 A * | 2/2022 | |
| WO | 2014146199 A1 | 9/2014 | |
| WO | WO-2021057652 A1 * | 4/2021 | ............. H04N 23/67 |

* cited by examiner

Primary Examiner — Fan Zhang (57) ABSTRACT

In certain embodiments, an ophthalmic surgical system that tracks the movement of an eye includes a laser device, a camera, and a computer. The laser device directs a laser beam towards the eye, and the camera captures images of the eye. The computer includes hardware and software. The hardware identifies objects in the images of the eye and determines whether each object is a candidate object according to one or more filtering criteria. A candidate object represents a candidate pupil image of the pupil of the eye. The hardware informs the software of the candidate objects. The software sorts the candidate objects according to one or more sorting criteria and identifies a candidate object as the pupil image according to the sorted candidate objects. The software tracks the movement of the eye using the pupil image.

22 Claims, 4 Drawing Sheets

EYE TRACKER WITH HARDWARE FILTERING AND SOFTWARE SORTING

TECHNICAL FIELD

The present disclosure relates generally to ophthalmic surgical systems, and more particularly to eye trackers with hardware filtering and software sorting.

BACKGROUND

In certain ophthalmic surgical procedures, a laser beam is directed towards the eye to treat the eye. For example, in laser-assisted in situ keratomileusis (LASIK) surgery, laser pulses are directed towards the eye in a particular pattern to ablate tissue in order to reshape the cornea. To effectively treat the eye, the laser beam should be accurately directed to specific points of the eye. Accordingly, certain systems utilize an eye tracker to monitor movement of the eye in order to direct the laser beam to the proper location.

BRIEF SUMMARY

In certain embodiments, an ophthalmic surgical system that tracks the movement of an eye includes a laser device, a camera, and a computer. The camera captures images of the eye. The computer includes hardware and software. The hardware identifies objects in the images and determines whether each object is a candidate object according to one or more filtering criteria. A candidate object represents a candidate pupil image of the pupil of the eye. The hardware informs the software of the candidate objects. The software sorts the candidate objects according to one or more sorting criteria and identifies a candidate object as the pupil image according to the sorted candidate objects. The software tracks the movement of the eye using the pupil image. The laser device directs a laser beam towards the tracked eye.

Embodiments may include none, one, some, or all of the following features: The filtering criteria includes a square bounding box filtering criterion. The hardware determines whether an object is a candidate object by: establishing a bounding box around the object, where the bounding box has a first side of a first length and a second side of a second length; and determining that the object is a candidate object if the bounding box is substantially square, e.g., where the first length is at most 30 percent different from the second length. The filtering criteria includes a bounding box area filtering criterion. The hardware determines whether an object is a candidate object by: establishing a bounding box around the object; and determining that the object is a candidate object if the area of the bounding box is in a range corresponding to the area of the bounding box of an average pupil. The filtering criteria includes an object area filtering criterion. The hardware determines whether an object is a candidate object by: calculating the area of the object; and determining that the object is a candidate object if the area of the object is in a range corresponding to the area of an average pupil. The filtering criteria are expressed as a logical or mathematical combination of filtering criteria. The hardware determines whether an object is a candidate object by determining whether the object satisfies the combination of the filtering criteria. The hardware determines a feature of a previous object identified as the pupil image in a previous image and refines a filtering criterion of the one or more filtering criteria in accordance with the feature. The sorting criteria includes an object area sorting criterion. The software sorts the candidate objects by: determining the area of each candidate object; and sorting the candidate objects according to area, where a candidate object with a larger area is given a higher priority than a candidate object with a smaller area. The sorting criteria includes a central location sorting criterion. The software sorts the candidate objects by: determining the proximity to the center of the image for each candidate object; and sorting the candidate objects according to proximity, where a candidate object closer to the center of the image is given a higher priority than a candidate object farther away from the center of the image. The sorting criteria includes a symmetry sorting criterion. The software sorts the candidate objects by: determining the symmetry of each candidate object; and sorting the candidate objects according to symmetry, where a more symmetrical candidate object is given a higher priority than a less symmetrical candidate object. The sorting criteria includes a roundness sorting criterion. The software sorts the candidate objects by: determining the roundness of each candidate object; and sorting the candidate objects according to roundness, where a more circular candidate object is given a higher priority than a less circular candidate object. The sorting criteria includes a density sorting criterion. The software sorts the candidate objects by: determining the density of each candidate object; and sorting the candidate objects according to density, where a higher density candidate object is given a higher priority than a lower density candidate object. The sorting criteria includes a tracking sorting criterion. The software determines the location of a previous object identified as the pupil image in a previous image. The software sorts the candidate objects by: determining the proximity of each candidate object to the location; and sorting the candidate objects according to proximity, where a more proximate candidate object is given a higher priority than a less proximate candidate object. The sorting criteria are expressed as an order to apply the sorting criteria. The software sorts the candidate objects by applying the sorting criteria according to the order. The sorting criteria are expressed as a mathematical combination of the sorting criteria. The software sorts the candidate objects by applying the sorting criteria according to the combination. The software determines a feature of a previous object identified as the pupil image in a previous image and refines a sorting criterion in accordance with the feature. The software identifies a candidate object as the pupil image according to the sorted candidate objects by, if there is only one candidate object, identifying that candidate object as the pupil image. The software identifies a candidate object as the pupil image according to the candidate objects sorted by priority by performing the following until a candidate object is selected: selecting a next higher priority candidate object of the sorted candidate objects; and if the selected candidate object satisfies one or more selection criteria, identifying the candidate object as the pupil image. A selection criterion may comprise a stricter version of a filtering criterion or may specify a restriction of a sorting criterion. Selection criteria may be expressed as a logical or mathematical combination of selection criteria, and the software may identify the candidate object as the pupil image if the candidate object satisfies the combination of the selection criteria. The software may determine a feature of a previous object identified as the pupil image in a previous image and refine a selection criterion in accordance with the feature. The computer instructs the laser device to direct the laser beam towards the eye in accordance with the tracked movement of the eye.

DESCRIPTION OF EXAMPLE EMBODIMENTS

Referring now to the description and drawings, example embodiments of the disclosed apparatuses, systems, and methods are shown in detail. The description and drawings are not intended to be exhaustive or otherwise limit the claims to the specific embodiments shown in the drawings and disclosed in the description. Although the drawings represent possible embodiments, the drawings are not necessarily to scale and certain features may be simplified, exaggerated, removed, or partially sectioned to better illustrate the embodiments.

Certain eye trackers track movement of the eye by monitoring movement of a feature of the eye (e.g., the pupil) in a series of images. Since the images can be generated at a high rate, e.g., at 1500 Hz, the eye tracker should quickly and efficiently identify the feature in the images. Accordingly, the eye tracker presented herein includes hardware that filters the images for objects that are likely candidates for the feature and sends these candidates to the software for sorting and identification of the feature. The filtering performed by the hardware allows the software to readily identify the feature, resulting in faster tracking of eye movement.

1. Example Ophthalmic Surgical System

Figure 1:
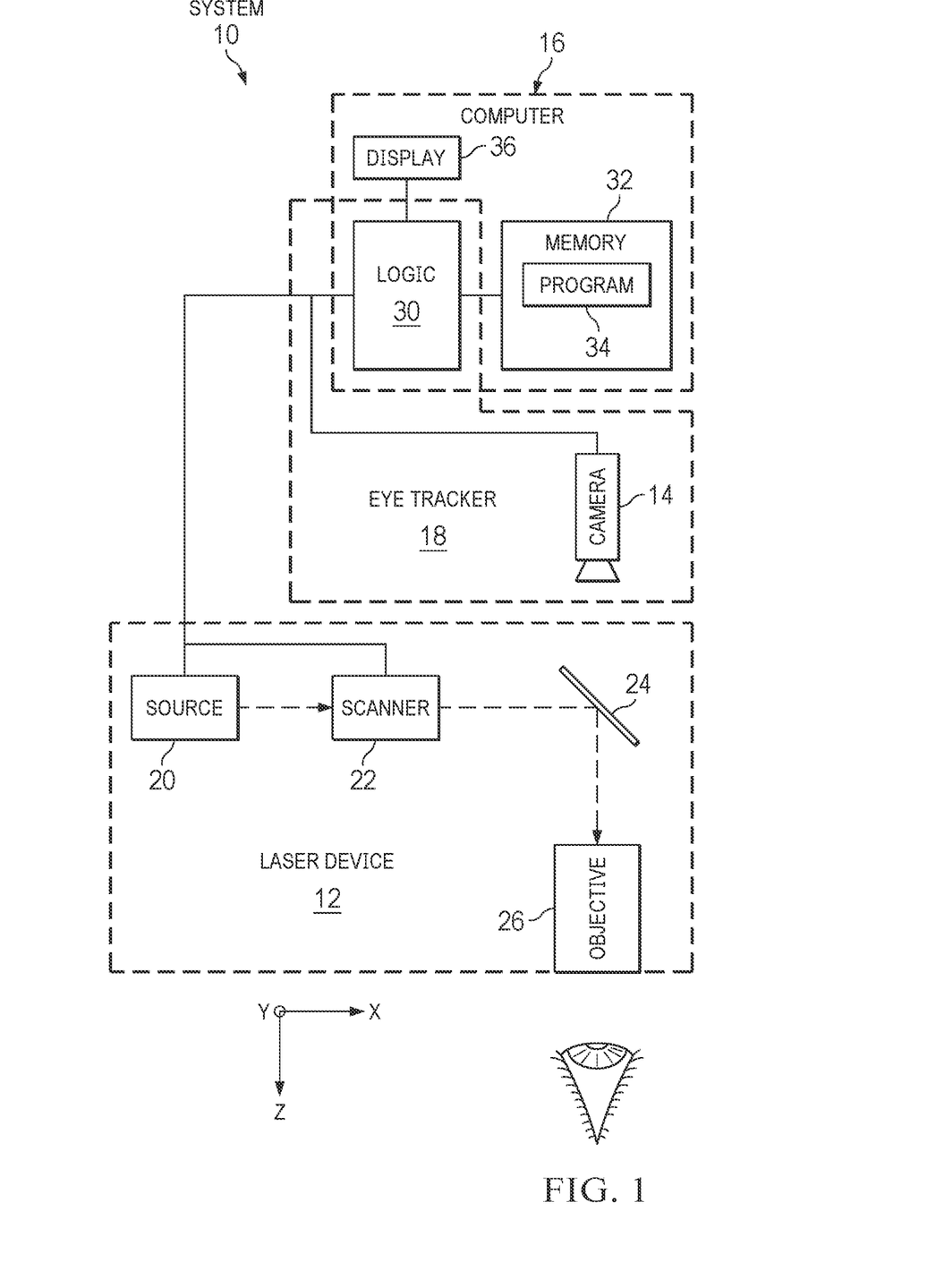
FIG. 1 illustrates an example of an ophthalmic surgical system that includes an eye tracker that tracks movement of an eye, according to certain embodiments.

FIG. 1 illustrates an example of an ophthalmic surgical system that includes an eye tracker that tracks movement of an eye, according to certain embodiments. In the illustrated example, an ophthalmic surgical system 10 includes a laser device 12, a camera 14, a control computer 16, and an eye tracker 18, coupled as shown. Laser device 12 includes a laser source 20, a scanner 22, one or more optical elements 24, and/or a focusing objective 26, coupled as shown. Computer 16 includes logic 30, a memory 32 (which stores a computer program 34), and a display 36, coupled as shown. Eye tracker 18 includes camera 14 and portions of logic 36. For ease of explanation, the following xyz-coordinate system is used: The z-axis is defined by the propagation direction of the laser beam when it is centered according to laser device 12, and the xy-plane is orthogonal to the propagation direction. Other suitable xyz-coordinate systems may be used.

As an overview, eye tracker 18 tracks movement of an eye. Camera 14 captures images of the eye. Computer 16 includes hardware and software. The hardware identifies objects in the images and determines whether the objects are candidate objects that likely represent the pupil. The software sorts the candidate objects according to the likelihood they represent the pupil and identifies a candidate object as the pupil image. The software tracks the movement of the eye according to the pupil image. Computer 16 instructs laser device 12 to direct a laser beam towards the eye according to the tracked movement of the eye.

Turning to the parts of system 10, laser device 12 directs laser pulses towards the eye according to a laser shot pattern. Laser source 20 generates a laser beam comprising the laser pulses. Laser source 20 may be an excimer, solid-state, femtosecond, or other suitable laser source that generates a laser beam of any suitable wavelength, e.g., an infrared or ultraviolet wavelength. A laser shot pattern specifies the coordinates (e.g., xy or xyz coordinates) of locations at which the laser pulses are to be directed. For example, the laser shot pattern may represent an ablation profile that indicates the particular locations of the cornea where tissue is to be removed.

Scanner 22 transversely and/or longitudinally directs the focal point of the laser beam. The transverse direction refers to directions orthogonal to the direction of beam propagation, i.e., the x- and y-directions. Examples of transverse scanners include galvanometric mirrors that tilt about mutually perpendicular axes and an electro-optical crystal electro-optically steers the laser beam. The longitudinal direction refers to the direction of the laser beam propagation, i.e., the z-direction. Examples of longitudinal scanners include a longitudinally adjustable lens, a lens of variable refractive power, and a deformable mirror that can control the z-position of the focal point.

One (or more) optical elements 24 direct the laser beam towards focusing objective 26. An optical element 24 can act on (e.g., transmit, reflect, refract, diffract, collimate, condition, shape, focus, modulate, and/or otherwise act on) a laser beam. Examples of optical elements include a lens, prism, mirror, diffractive optical element (DOE), holographic optical element (HOE), and spatial light modulator (SLM). In the example, optical element 24 is a mirror. Focusing objective 26 focuses the focal point of laser beam towards a point of the eye. In the example, focusing objective 26 is an objective lens.

Camera 14 records images of the eye and generates image data that represent recorded images of the eye. The image data are provided to computer 16 for analysis and may also be provided to display 35 to present the images of the eye. Camera 14 may record images at any suitable frequency, such as a high frequency, e.g., 1500 Hz or greater. Examples of camera 14 include a charged-coupled device (CCD), video, complementary metal-oxide semiconductor (CMOS) sensor (e.g., active-pixel sensor (APS)), line sensor, and optical coherence tomography (OCT) camera.

Computer 16 controls components of system 10 (e.g., laser 12, camera 14, eye tracker 18, laser source 20, scanner 22, optical elements 24, and/or focusing objective 26) to treat an eye. In the example, computer 16 determines the location and position of the eye from eye tracker 18 and aligns a laser shot pattern with the tracked eye. Computer 16 then instructs laser device 12 to direct laser pulses towards the eye according to the laser shot pattern.

Eye tracker 18 tracks the movement of the eye. Camera 14 delivers image data that represent recorded images of the eye to logic 30 of computer 16, which performs image processing on the image data to analyze the images. Logic 30 includes hardware and software. The hardware filters the images for objects that are likely candidates for the pupil and sends these candidates to the software for sorting and identification of the pupil. The filtering performed by the hardware allows the software to readily identify the pupil, resulting in faster monitoring of eye movement. An example of eye tracker 18 is described in more detail with reference to FIGS. 2 and 3.

2. Example Eye Tracker

Figure 2:
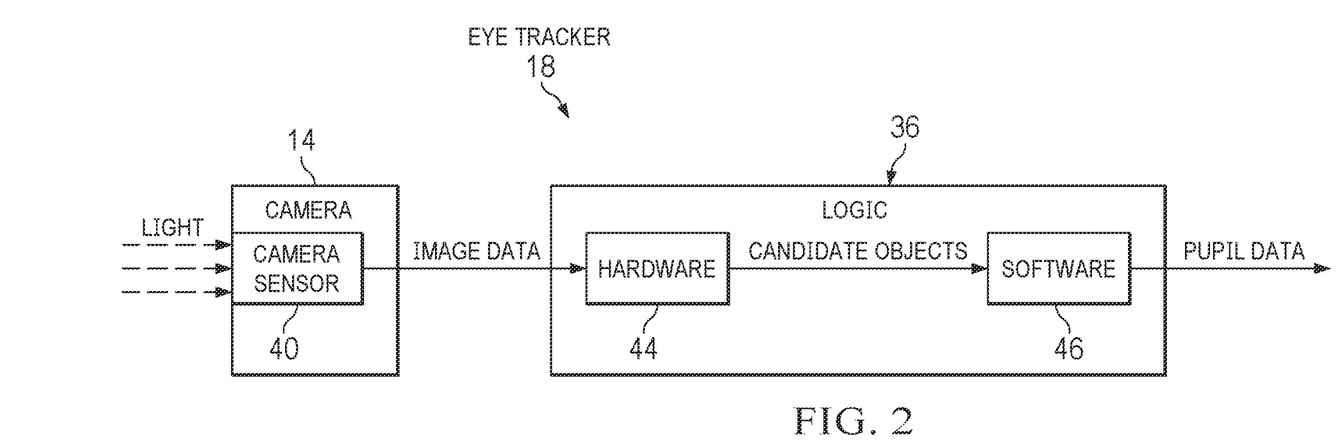
FIG. 2 illustrates an example of an eye tracker that may be used with the system of FIG. 1 to track the movement of an eye, according to certain embodiments.

FIG. 2 illustrates an example of eye tracker 18 that may be used with system of FIG. 1 to track the movement of an eye, according to certain embodiments. In the example, eye tracker 18 includes camera 14 and portions of logic 36.

Camera 14 includes a camera sensor 40, and logic 36 includes hardware 44 and software 46. Camera sensor 40 converts input light into electronic signals and may be, e.g., a charge-coupled device or other suitable sensor. Hardware 44 may be an integrated circuit and may be programmable or application specific, such as a field-programmable gate array (FPGA), complex programmable logic device (CPLD), or application-specific integrated circuit (ASIC). Software 46 may be stored in memory 32.

2.1 Hardware Filtering

In more detail, hardware 44 identifies objects in images of the eye, determines whether each object is a candidate object representing a candidate pupil image according to filtering criteria, and informs software 46 of the candidate objects. Hardware 44 may identify objects in any suitable manner. For example, hardware may use edge detection to identify objects. Edge detection uses discontinuities in image brightness to determine the border of an object. Hardware 44 may use any suitable filtering criteria to select candidate objects that are likely pupil images. Examples of filter criteria include the following.

2.1.1. Object Area Filtering Criterion. This criterion selects objects with an area similar to that of an average pupil, e.g., an area that satisfies an area range (a "criterion area range") corresponding to the area of an average pupil (e.g., 0.8 millimeter-squared ($mm^2$) to 80 $mm^2$). The criterion area range may be similar to the area of the average pupil, or may be broader or narrower (by, e.g., +/−10 $mm^2$) to yield a larger or smaller set of candidate objects. In an example, hardware 44 determines the border of an object and then calculates the area of the object. Hardware 44 then informs software 46 of the object by sending the coordinates of points within the object.

Figure 3:
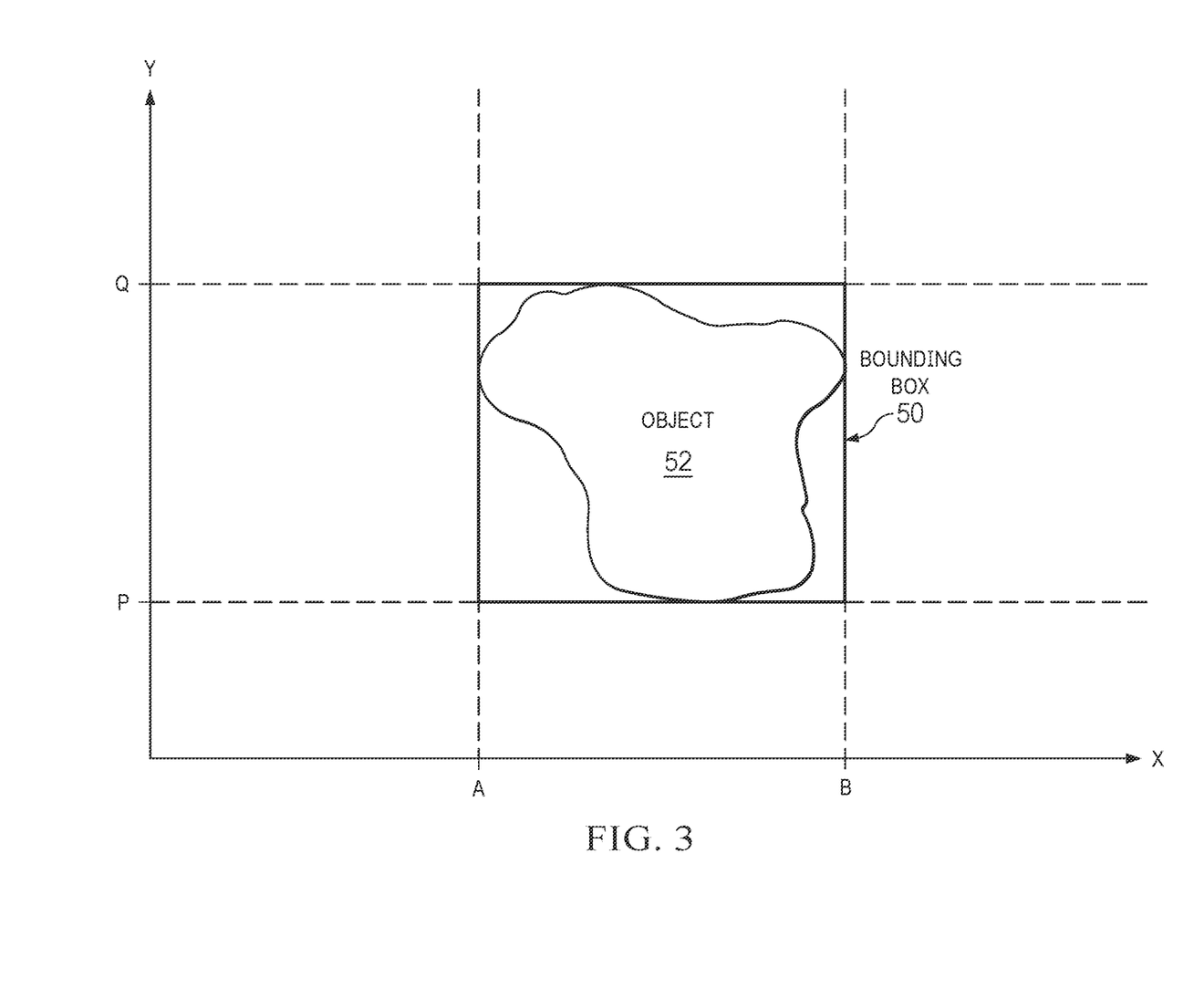
FIG. 3 illustrates an example of a bounding box placed about an object that may be used to select candidate objects, according to certain embodiments.

2.1.2. Bounding Boxes. FIG. 3 illustrates an example of a bounding box 50 placed about object 52 that may be used to select candidate objects, according to certain embodiments. In the embodiments, bounding box 50 is the smallest rectangle that encloses object 52, e.g., box 50 is a minimum-perimeter bounding box. In the example, borders of box include vertical lines x=a and x=b and horizontal lines y=p and y=q, where x and y are relative to the xy-plane orthogonal to the z-direction of the laser beam. The vertical lines may be longer, equal to, or shorter than the horizontal lines. The coordinates of the borders may be used to describe box 50, which may be used to identify an object bound by box 50. For example, hardware 44 may inform software 46 of an object 52 by sending the border coordinates of bounding box 50 of object 52.

2.1.2.1 Square Bounding Box Filtering Criterion. Pupils are substantially circular, so objects with substantially square bounding boxes are more likely to represent a pupil. Accordingly, this criterion selects object 52 if the bounding box 50 of object 52 is substantially square, e.g., where the length of a horizontal side is substantially the same as (e.g., at most 10, 15, 20, or 30 percent different from) the length of a vertical side.

2.1.2.2 Bounding Box Area Filtering Criterion. This criterion selects objects with a bounding box with an area ("bounding box area") corresponding to the bounding box area of an average pupil, e.g., 1 millimeter-squared ($mm^2$) to 64 $mm^2$. The criterion area range may be similar to the bounding box area of the average pupil, or may be broader or narrower (by, e.g., +/−10 $mm^2$) to yield a larger or smaller set of candidate objects.

2.1.3. Filtering Criteria Combination. In certain embodiments, a combination of filtering criteria may be used to select candidate objects. For example, the combination may be expressed as a logical combination of filtering criteria F1, F2, . . . Fj, e.g., "F1 AND F2" or "F1 OR F2". To satisfy "F1 AND F2" an object must satisfy F1 and F2. As another example, the combination may be expressed as a mathematical combination of filtering criteria F1, F2, . . . Fj, e.g., "F1/F2", where F1 represents the pupil area and F2 represents the pupil bounding box area.

2.1.4. Filtering Criteria Refinement. In certain embodiments, a filtering criterion may be refined in response to a feature of the pupil identified from a previous image, e.g., location, size, shape, area, brightness, density, bounding box features, symmetry, or roundness. For example, the area of the object representing the pupil in a previous image may be determined. In response, the area range of, e.g., the Object Area Filtering Criterion, may be refined to filter for a narrow range (e.g., +/−10 $mm^2$) around the pupil area.

2.2 Software Sorting

Returning to FIG. 2, software 46 sorts candidate objects according to sorting criteria, and identifies a candidate object as the pupil image according to the sorted candidate objects. Software 46 may use any suitable sorting criteria to sort candidate objects according to the likelihood they are pupil images. Higher priority may be given to a candidate object more likely to be the pupil image. Examples of sorting criteria include the following.

2.2.1 Object Area Sorting Criterion. A larger object is more likely to be the pupil, as the pupil tends to be the largest object in an eye image. In an example, software 46 calculates the areas of objects and sorts the objects according to area. An object with a larger area is given a higher priority than an object with a smaller area, where the highest priority is given to the object with the largest area.

2.2.2 Central Location Sorting Criterion. An object closer to the center of the image is more likely to be the pupil because the pupil is usually at the center of an eye image. In an example, software 46 determines the location of objects within images and sorts the objects according to their locations. An object closer to the center of an eye image is given a higher priority than an object farther away, where the highest priority is given to the object closest to (and could be at) the center of the image. In certain embodiments, the proximity of an object to the image center may be determined by the proximity of the center of the object (e.g., the center of mass of the object) to the image center.

2.2.3 Symmetry Sorting Criterion. A more symmetrical object is more likely to be the pupil image because the pupil is generally circular. In an example, software 46 determines the symmetry of objects and sorts the candidate according to their symmetry. A more symmetrical object is given a higher priority than a less symmetrical object, where the highest priority is given to the most symmetrical object. In certain embodiments, a more symmetrical object may be an object with more lines of symmetry or a smaller angle of rotational symmetry.

2.2.4 Roundness Sorting Criterion. A more circular object is more likely to be the pupil image because the pupil is generally circular. In an example, software 46 determines the roundness of objects and sorts the objects according to roundness. A more circular object is given higher priority than a less circular object, where the highest priority is given to the most circular object. In certain embodiments, roundness is measured by the ratio between inscribed and circumscribed circles of an object, where a rounder object has a higher ratio.

2.2.5 Density Sorting Criterion. A denser object is more likely to be the pupil image because the pupil is usually the darkest object in an image. In an example, software 46 determines the density of objects and sorts the objects according to density. A higher density object is given a higher priority than a lower density object, where the highest priority is given to the densest object. In certain embodiments, density may be measured by the percentage of darker pixels (e.g., pixels that are at least 80% black), where the higher percentage indicates higher density.

2.2.6 History/Tracking Sorting Criterion. Features of the eye do not move much, especially relative to other features of the eye. Thus, if an object in a previous image is identified as the pupil image, an object closer to the location of the identified object in a subsequent image is more likely to be the pupil image. In an example, software 46 determines the location of the object representing the pupil image. In subsequent images, an object closer to the location is given a higher priority than an object farther away from the location, where the highest priority is given to the closest object (which may the object at the location).

2.2.7 Sorting Criteria Combination. In certain embodiments, a combination of sorting criteria may be used to sort candidate objects. In some cases, the combination may be expressed as an order according to which sorting criteria $S1, S2, \ldots Sj$ are applied to sort candidate objects. For example, according to the order "First S1, then S2", objects are first sorted according to S1, then objects that have the same value for S1 are sorted according to S2. In other cases, the combination may be expressed as a mathematical combination of sorting criteria $S1, S2, \ldots, Sj$, such as a weighted combination of sorting criteria $w1S1, w2S2, \ldots, wjSj$, where wi represents the weight assigned to criterion S1. For example, objects may be scored according to "w1 S1+w2S2", and then sorted according to their scores.

2.2.8 Sorting Criteria Refinement. In certain embodiments, sorting criteria may be refined in response to a feature of the pupil identified from a previous image (as described with reference to refining the filtering criteria). For example, the location of the object representing the pupil in a previous image may be determined. In response, the Central Location Sorting Criteria may be refined to give higher priority to objects closer to the location of the pupil instead of the center of the image.

2.3 Example Selection Criteria

Software 46 identifies a candidate object as the pupil image in any suitable manner. For example, if there is only one candidate object, that candidate object is identified as the pupil image. If there are multiple candidate objects, software 46 may perform the following until a candidate object is selected as the pupil image: select a candidate object of the sorted candidate objects according to priority (e.g., higher priority selected before lower priority); and if the selected candidate object satisfies one or more selection criteria, the candidate object is identified as the pupil image. In cases where there are no candidate objects, computer 16 may search for candidate objects in subsequent images.

2.3.1 Selection Criteria from Filtering Criteria. In certain embodiments, a selection criterion may be a stricter version of a filtering criterion. For example, if a filtering criterion has a specific range, the selection criterion uses a more restrictive range to select the pupil image. Examples of such selection criteria include the following.

(1) Object Area: The area of the object is between 2 millimeter-squared ($mm^2$) and 40 $mm^2$;
(2) Bounding Box Area: The area of the bounding box is between 4 millimeter-squared ($mm^2$) and 50 $mm^2$; and
(3) Bounding Box Square: The bounding box is substantially square where the first length is at most 10 percent different from the second length.

2.3.2 Selection Criteria from Sorting Criteria. In certain embodiments, a selection criterion may specify a restriction of a sorting criterion. For example, if a sorting criterion sorts by a feature, the selection criterion uses a restriction of the feature to select the pupil image. Examples of such selection criteria include the following.

(1) Central Location: The object is within 2 millimeters (mm) of the center of the image;
(2) Symmetry: The object has at least two axes of symmetry or an angle of rotational symmetry less than 45 degrees;
(3) Roundness: The object a has roundness ratio between inscribed and circumscribed circles of the object of greater than 0.8; and
(4) Density: The object has a percentage of darker pixels greater than 90%.

2.3.3 Combination of Selection Criteria. In certain embodiments, a logical or mathematical combination of selection criteria may be used to select the pupil image, in a manner similar to that for the combination of filtering or sorting criteria. In certain embodiments, selection criteria may be applied in a particular order to select the pupil image, in a manner similar to that for ordering the sorting criteria.

2.3.4 Selection Criteria Refinement. In certain embodiments, selection criteria may be refined in response to a feature of the pupil identified from a previous image (as described with reference to refining filtering and sorting criteria). For example, the location of the object representing the pupil image in a previous image may be determined. In response, the Central Location Selection Criteria may be refined to select objects closer to the location of the pupil instead of the center of the image.

3. Example Eye Tracking Method

Figure 4:
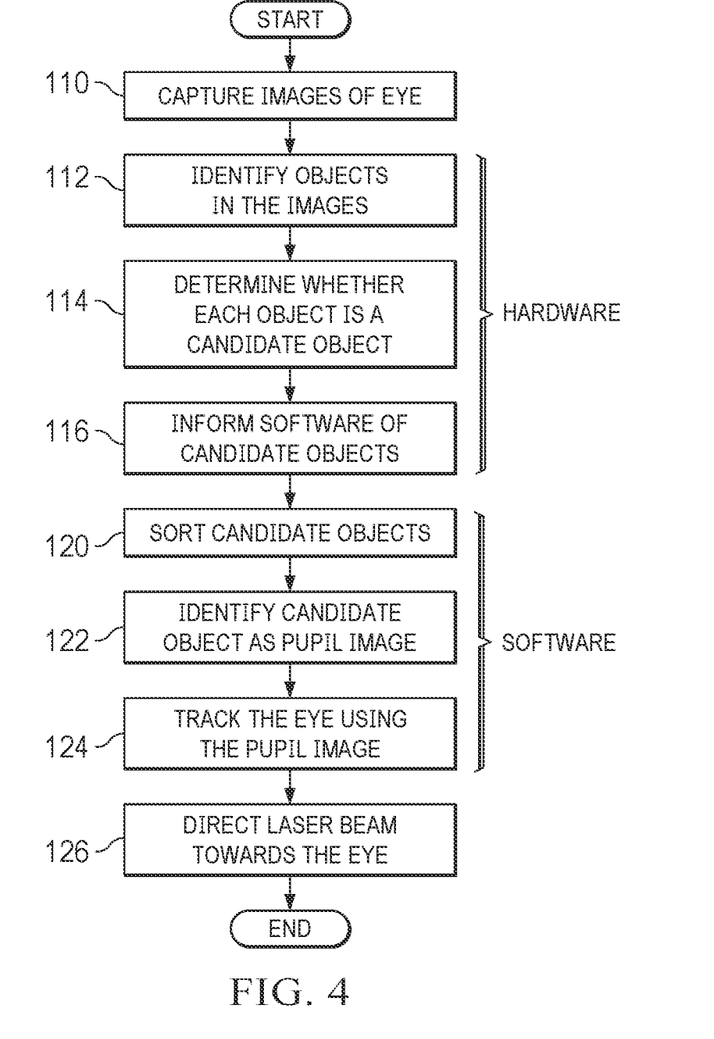
FIG. 4 illustrates an example of a method for identifying a feature of an eye (e.g., the pupil) to track movement of an eye, which may be performed by the eye tracker of FIG. 2, according to certain embodiments.

FIG. 4 illustrates an example of a method for identifying a feature of an eye (e.g., the pupil) to track movement of an eye, which may be performed by the eye tracker of FIG. 2, according to certain embodiments. The method starts at step 110, where camera 14 capture images of the eye. Steps 112 to 116 are performed by hardware 44. Objects in the images are identified at step 112. Hardware 44 may identify the object by, e.g., edge detection. Hardware 44 determines whether each object is a candidate object according to filtering criteria at step 114. Examples of filtering criteria include the square bounding box, bounding box, object area, and/or other suitable filtering criteria. Hardware 44 informs software 46 of the candidate objects at step 116. For example, hardware may send to software 46 coordinates of the object and/or the bounding box surrounding the object to software 46.

Steps 120 are 122 are performed by software 46. Software 46 sorts candidate objects at step 120 according to sorting criteria. Examples of sorting criteria include the object area, central location, symmetry, roundness, density, and/or other suitable sorting criteria. Software 46 identifies a candidate object as the pupil image at step 122 according to the sorted candidate objects. For example, if there is only one candidate object, that candidate object is identified as the pupil image. If there are multiple candidate objects, software 46 may perform the following until a candidate object is selected as the pupil image: select a candidate object of the sorted candidate objects according to priority (e.g., higher priority selected before lower priority); and if the selected candidate object satisfies one or more selection criteria, the candidate object is identified as the pupil image. Software 46 tracks the eye using the pupil image at step 124.

Once the position of the eye has been tracked, computer 16 instructs laser device 12 to direct a laser beam towards the eye at step 126 according to the tracked movement of the eye. The method ends.

A component (such as control computer 16) of the systems and apparatuses disclosed herein may include an interface, logic, and/or memory, any of which may include computer hardware and/or software. An interface can receive input to the component and/or send output from the component, and is typically used to exchange information between, e.g., software, hardware, peripheral devices, users, and combinations of these. A user interface is a type of interface that a user can utilize to communicate with (e.g., send input to and/or receive output from) a computer. Examples of user interfaces include a display, Graphical User Interface (GUI), touchscreen, keyboard, mouse, gesture sensor, microphone, and speakers.

Logic can perform operations of the component. Logic may include one or more electronic devices that process data, e.g., execute instructions to generate output from input. Examples of such an electronic device include a computer, processor, microprocessor (e.g., a Central Processing Unit (CPU)), and computer chip. Logic may include computer software that encodes instructions capable of being executed by an electronic device to perform operations. Examples of computer software include a computer program, application, and operating system.

A memory can store information and may comprise tangible, computer-readable, and/or computer-executable storage medium. Examples of memory include computer memory (e.g., Random Access Memory (RAM) or Read Only Memory (ROM)), mass storage media (e.g., a hard disk), removable storage media (e.g., a Compact Disk (CD) or Digital Video or Versatile Disk (DVD)), database, network storage (e.g., a server), and/or other computer-readable media. Particular embodiments may be directed to memory encoded with computer software.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, or the operations of the systems and apparatuses may be performed by more, fewer, or other components, as apparent to those skilled in the art. As another example, modifications may be made to the methods disclosed herein. The methods may include more, fewer, or other steps, and the steps may be performed in any suitable order, as apparent to those skilled in the art.

To aid the Patent Office and readers in interpreting the claims, Applicants note that they do not intend any of the claims or claim elements to invoke 35 U.S.C. § 112(f), unless the words "means for" or "step for" are explicitly used in the particular claim. Use of any other term (e.g., "mechanism," "module," "device," "unit," "component," "element," "member," "apparatus," "machine," "system," "processor," or "controller") within a claim is understood by the applicants to refer to structures known to those skilled in the relevant art and is not intended to invoke 35 U.S.C. § 112(f).

What is claimed:

1. An ophthalmic surgical system that tracks movement of an eye, comprising:
a laser device configured to direct a laser beam towards the eye;
a camera configured to capture a plurality of images of the eye; and
a computer comprising:
hardware configured to:
identify a plurality of objects in the plurality of images of the eye;
establish a bounding box around each object of the plurality of objects to yield a plurality of bounding boxes, each bounding box of the plurality of bounding boxes described by a plurality of border coordinates;
apply one or more filtering criteria to each bounding box of the plurality of bounding boxes to determine whether each object of the plurality of objects is a candidate object in order to yield two or more candidate objects, a candidate object representing a candidate pupil image of a pupil of the eye, the two or more candidate objects comprising a first candidate object that is a pupil image of the pupil of the eye and a second candidate object that is not the pupil image of the pupil of the eye; and
send the plurality of border coordinates of the two or more candidate objects to software in order to inform the software of the two or more candidate objects; and
the software configured to:
sort the two or more candidate objects according to one or more sorting criteria;
identify a candidate object as the pupil image of the pupil according to the sorted two or more candidate objects; and
track the movement of the eye using the pupil image.

2. The ophthalmic surgical system of claim 1:
the one or more filtering criteria comprising a square bounding box filtering criterion; and
the hardware configured to determine whether an object is a candidate object by:
establishing the bounding box around the object, the bounding box having a first side of a first length and a second side of a second length; and
if the bounding box is substantially square, where the first length is at most 30 percent different from the second length, determining that the object is a candidate object.

3. The ophthalmic surgical system of claim 1:
the one or more filtering criteria comprising a bounding box area filtering criterion; and
the hardware configured to determine whether an object is a candidate object by:
establishing the bounding box around the object, the bounding box having an area; and
if the area of the bounding box is in a range corresponding to an area of a bounding box of an average pupil, determining that the object is a candidate object.

4. The ophthalmic surgical system of claim 1:
the one or more filtering criteria comprising an object area filtering criterion; and
the hardware further configured to determine whether an object is a candidate object, each object having an area, by:
calculating the area of the object; and if the area of the object is in a range corresponding to an area of an average pupil, determining that the object is a candidate object.

5. The ophthalmic surgical system of claim 1:
the one or more filtering criteria expressed as a logical or mathematical combination of the filtering criteria; and
the hardware further configured to determine whether an object is a candidate object by determining whether the object satisfies the combination of the filtering criteria.

6. The ophthalmic surgical system of claim 1, the hardware configured to:
determine a feature of a previous object identified as the pupil image in a previous image; and
refine a filtering criterion of the one or more filtering criteria in accordance with the feature.

7. The ophthalmic surgical system of claim 1:
the one or more sorting criteria comprising an object area sorting criterion; and
the software configured to sort the two or more candidate objects, each candidate object having an area, by:
determining the area of each candidate object of the two or more candidate objects; and
sorting the candidate objects according to the areas, where a candidate object with a larger area is given a higher priority than a candidate object with a smaller area.

8. The ophthalmic surgical system of claim 1:
the one or more sorting criteria comprising a central location sorting criterion; and
the software configured to sort the two or more candidate objects of the plurality of images, each candidate object having proximity to a center of the image, by:
determining the proximity to the center of the image for each candidate object of the two or more candidate objects; and
sorting the candidate objects according to proximity, where a candidate object closer to the center of the image is given a higher priority than a candidate object farther away from the center of the image.

9. The ophthalmic surgical system of claim 1:
the one or more sorting criteria comprising a symmetry sorting criterion; and
the software configured to sort the two or more candidate objects, each candidate object having a symmetry, by:
determining the symmetry of each candidate object of the two or more candidate objects; and
sorting the candidate objects according to symmetry, where a more symmetrical candidate object is given a higher priority than a less symmetrical candidate object.

10. The ophthalmic surgical system of claim 1:
the one or more sorting criteria comprising a roundness sorting criterion; and
the software configured to sort the two or more candidate objects, each candidate object having a roundness, by:
determining the roundness of each candidate object of the two or more candidate objects; and
sorting the candidate objects according to roundness, where a more circular candidate object is given a higher priority than a less circular candidate object.

11. The ophthalmic surgical system of claim 1:
the one or more sorting criteria comprising a density sorting criterion; and
the software configured to sort the two or more candidate objects, each candidate object having a density, by:
determining the density of each candidate object of the two or more candidate objects; and
sorting the candidate objects according to density, where a higher density candidate object is given a higher priority than a lower density candidate object.

12. The ophthalmic surgical system of claim 1:
the one or more sorting criteria comprising a tracking sorting criterion; and
the software configured to determine a location of a previous object identified as the pupil image in a previous image and to sort the two or more candidate objects by:
determining a proximity of each candidate object of the two or more candidate objects to the location; and
sorting the candidate objects according to proximity, where a more proximate candidate object is given a higher priority than a less proximate candidate object.

13. The ophthalmic surgical system of claim 1:
the one or more sorting criteria expressed as an order to apply the sorting criteria; and
the software configured to sort the two or more candidate objects by applying the sorting criteria according to the order.

14. The ophthalmic surgical system of claim 1:
the one or more sorting criteria expressed as a mathematical combination of the sorting criteria; and
the software configured to sort the two or more candidate objects according to the combination.

15. The ophthalmic surgical system of claim 1, the software configured to:
determine a feature of a previous object identified as the pupil image in a previous image; and
refine a sorting criterion in accordance with the feature.

16. The ophthalmic surgical system of claim 1, the software configured to identify a candidate object as the pupil image according to the sorted two or more candidate objects by:
if the two or more candidate objects comprises only one candidate object, identifying the one candidate object as the pupil image.

17. The ophthalmic surgical system of claim 1, the software configured to identify a candidate object as the pupil image according to the sorted two or more candidate objects by performing the following until a candidate object is selected as the pupil image, the candidate objects sorted by priority:
selecting a next higher priority candidate object of the sorted two or more candidate objects; and
if the selected candidate object satisfies one or more selection criteria, identifying the candidate object as the pupil image.

18. The ophthalmic surgical system of claim 17, a selection criterion of the one or more selection criteria comprising a stricter version of a filtering criterion.

19. The ophthalmic surgical system of claim 17, a selection criterion of the one or more selection criteria specifying a restriction of a sorting criterion.

20. The ophthalmic surgical system of claim 17:
the one or more selection criteria expressed as a logical or mathematical combination of the selection criteria; and
the software configured to identify the candidate object as the pupil image if the candidate object satisfies the combination of the selection criteria.

21. The ophthalmic surgical system of claim 17, the software configured to:
determine a feature of a previous object identified as the pupil image in a previous image; and
refine a selection criterion in accordance with the feature.

22. The ophthalmic surgical system of claim 1, the computer configured to instruct the laser device to direct the laser beam towards the eye in accordance with the tracked movement of the eye.

\* \* \* \* \*